United States Patent
Gibbon et al.

(10) Patent No.: US 7,224,411 B2
(45) Date of Patent: May 29, 2007

(54) DIGITAL PROJECTION EQUIPMENT AND TECHNIQUES

(75) Inventors: Michael A. Gibbon, Oakville (CA); Samuel Z. Zhou, North York (CA); Graham H. Moss, Oldham (GB); Dermot J. Quinn, Huddersfield (GB); Steven Wilding, Bury (GB); Brian Eckersley, Manchester (GB); Sean Adkins, Vancouver (CA); Sergei G. Anikitchev, Burnaby (CA); Steven Read, Mississauga (CA)

(73) Assignee: Imax Corporation (CA)

( * ) Notice: Subject to any disclaimer, the term of this patent is extended or adjusted under 35 U.S.C. 154(b) by 784 days.

(21) Appl. No.: 09/980,068

(22) PCT Filed: May 30, 2001

(86) PCT No.: PCT/US01/10525

§ 371 (c)(1),
(2), (4) Date: Nov. 28, 2001

(87) PCT Pub. No.: WO01/96907

PCT Pub. Date: Dec. 20, 2001

(65) Prior Publication Data

US 2003/0063226 A1 Apr. 3, 2003

Related U.S. Application Data

(60) Provisional application No. 60/215,715, filed on Jul. 3, 2000.

(30) Foreign Application Priority Data

Mar. 31, 2000 (GB) .................................. 0007891.5

(51) Int. Cl.
*H04N 5/74* (2006.01)

(52) U.S. Cl. ...................... 348/757; 348/750; 348/778; 348/780; 348/383

(58) Field of Classification Search ................ 348/757, 348/750–752, 383, 744, 756, 758, 778–780; 355/53, 67, 71; 356/399–401; 250/548; 359/291, 855; *H04N 5/74, 9/31*
See application file for complete search history.

(56) References Cited

U.S. PATENT DOCUMENTS 3,909,525 A     9/1975   Fagan (Continued)

FOREIGN PATENT DOCUMENTS

CA     2227920     7/1999

(Continued)

OTHER PUBLICATIONS

Patent Abstracts of Japan, vol. 1995, No. 08, Sep. 29, 1995 & JP 07 134275 A (Mitsubishi Electric Corp.), May 23, 1995.

(Continued)

*Primary Examiner*—Trang Tran
(74) *Attorney, Agent, or Firm*—Kilpatrick Stockton LLP

(57) ABSTRACT

Apparatus and techniques for enhancing characteristics of electronic projection systems are detailed. Included among the techniques are both superimposition of sub-images and tiling of superimposed images, the combination of which can be advantageous in improving resolution of projected images. Pre-modulators and polarizing beam splitters also may be used as parts of the innovative systems.

5 Claims, 4 Drawing Sheets

U.S. PATENT DOCUMENTS

| | | |
|---|---|---|
| 4,588,259 A | 5/1986 | Sheiman |
| 4,638,309 A | 1/1987 | Ott |
| 4,843,381 A | 6/1989 | Baron |
| 4,974,073 A | 11/1990 | Inova |
| 5,011,277 A | 4/1991 | Ogino et al. |
| 5,077,154 A | 12/1991 | Corley |
| 5,085,495 A | 2/1992 | Iwahara et al. |
| 5,086,341 A | 2/1992 | Tamada et al. |
| 5,116,117 A | 5/1992 | Miyashita |
| 5,136,390 A | 8/1992 | Inova et al. |
| 5,153,621 A | 10/1992 | Vogeley |
| 5,157,523 A | 10/1992 | Yamagishi et al. |
| 5,272,473 A | 12/1993 | Thompson et al. |
| 5,278,652 A | 1/1994 | Urbanus et al. |
| 5,280,277 A | 1/1994 | Hornbeck |
| 5,300,966 A | 4/1994 | Uehira et al. ............... 353/30 |
| 5,382,990 A | 1/1995 | Hath et al. |
| 5,386,253 A | 1/1995 | Fielding ............... 348/745 |
| 5,400,093 A | 3/1995 | Timmers |
| 5,490,009 A | 2/1996 | Venkateswar et al. ...... 359/291 |
| 5,555,035 A | 9/1996 | Mead et al. ............... 348/757 |
| 5,589,852 A | 12/1996 | Thompson et al. ......... 345/147 |
| 5,592,239 A | 1/1997 | Hara et al. |
| 5,612,753 A | 3/1997 | Poradish et al. ............ 348/743 |
| 5,626,411 A | 5/1997 | Takahashi et al. ............ 353/94 |
| 5,656,403 A | 8/1997 | Shieh |
| 5,668,611 A | 9/1997 | Ernstoff et al. |
| 5,673,060 A | 9/1997 | Blaxtan et al. |
| 5,686,939 A | 11/1997 | Millward et al. |
| 5,689,283 A | 11/1997 | Shirochi |
| 5,699,130 A | 12/1997 | Taylor |
| 5,704,701 A | 1/1998 | Kavanaugh et al. |
| 5,706,061 A | 1/1998 | Marshall et al. |
| 5,757,348 A | 5/1998 | Handschy et al. |
| 5,771,072 A | 6/1998 | Tokoro et al. |
| 5,796,442 A | 8/1998 | Gove et al. ............... 348/556 |
| 5,809,182 A | 9/1998 | Ward et al. ............... 382/298 |
| 5,835,264 A | 11/1998 | Tandler et al. |
| 5,844,663 A | 12/1998 | Holley et al. ............... 355/32 |
| 5,847,784 A | 12/1998 | Finnila et al. |
| 5,865,520 A | 2/1999 | Kavanagh et al. |
| 5,902,030 A | 5/1999 | Blanchard ............... 353/30 |
| 5,903,388 A | 5/1999 | Sedlmayr |
| 5,917,562 A | 6/1999 | Woodgate et al. |
| 5,933,588 A | 8/1999 | Easwar et al. |
| 5,956,000 A | 9/1999 | Kreitman et al. ............... 345/1 |
| 5,978,142 A | 11/1999 | Blackham et al. |
| 5,986,640 A | 11/1999 | Baldwin et al. |
| 5,988,817 A | 11/1999 | Mizushima et al. |
| 5,990,982 A | 11/1999 | Gove et al. ............... 348/750 |
| 5,993,004 A | 11/1999 | Moseley et al. |
| 6,017,123 A | 1/2000 | Bleha et al. ............... 353/30 |
| 6,034,660 A | 3/2000 | Millward et al. |
| 6,057,816 A | 5/2000 | Eckersley |
| 6,064,366 A | 5/2000 | Millward et al. |
| 6,115,022 A | 9/2000 | Mayer, III et al. |
| 6,128,131 A | 10/2000 | Tang |
| 6,193,375 B1 | 2/2001 | Nagata et al. |
| 6,215,547 B1 | 4/2001 | Ramanujan et al. |
| 6,215,590 B1 | 4/2001 | Okano |
| 6,222,593 B1 | 4/2001 | Higurashi et al. |
| 6,224,217 B1 * | 5/2001 | Tanaka ............... 353/94 |
| 6,232,936 B1 | 5/2001 | Gove et al. |
| 6,276,801 B1 | 8/2001 | Fielding |
| 6,285,349 B1 | 9/2001 | Smith |
| 6,317,112 B1 | 11/2001 | Handschy et al. |
| 6,348,907 B1 | 2/2002 | Wood |
| 6,373,603 B1 * | 4/2002 | Popovich et al. ............. 359/15 |
| 6,377,306 B1 | 4/2002 | Johnson et al. |
| 6,456,301 B1 | 9/2002 | Huang |
| 6,456,339 B1 | 9/2002 | Surati et al. |
| 6,480,175 B1 | 11/2002 | Schneider |
| 6,545,685 B1 | 4/2003 | Dorbie |
| 6,570,623 B1 | 5/2003 | Li et al. |
| 6,590,621 B1 | 7/2003 | Creek et al. |
| 6,608,652 B1 | 8/2003 | Yamazaki et al. |
| 6,695,451 B1 | 2/2004 | Yamasaki et al. |
| 6,727,864 B1 | 4/2004 | Johnson et al. |
| 6,751,006 B2 | 6/2004 | Zhou et al. |
| 6,760,075 B2 | 7/2004 | Mayer et al. |
| 6,795,221 B1 * | 9/2004 | Urey ............... 359/199 |
| 2002/0024640 A1 | 2/2002 | Ioka |
| 2002/0041364 A1 | 4/2002 | Ioka |
| 2003/0016335 A1 | 1/2003 | Penn |
| 2003/0117714 A1 | 6/2003 | Nakamura et al. |
| 2003/0142274 A1 | 7/2003 | Gibbon |
| 2003/0156262 A1 | 8/2003 | Baker |
| 2004/0001184 A1 | 1/2004 | Gibbon et al. |

FOREIGN PATENT DOCUMENTS

| | | |
|---|---|---|
| EP | 0 139 991 A2 | 5/1985 |
| EP | 0 606 162 A2 | 7/1994 |
| EP | 0 751 683 A2 | 1/1997 |
| EP | 0 786 687 A | 7/1997 |
| EP | 0 961 502 A2 | 12/1999 |
| EP | 0 755 556 | 5/2000 |
| EP | 1 058 158 A2 | 12/2000 |
| EP | 1 102 495 A2 | 5/2001 |
| EP | 1 137 290 A2 | 9/2001 |
| EP | 1 292 134 A2 | 3/2003 |
| FR | 2 774 481 | 8/1999 |
| GB | 2352836 | 2/2001 |
| JP | 05 066501 | 3/1993 |
| JP | 06 102484 | 4/1994 |
| JP | 08 168039 A | 6/1996 |
| JP | 10 319500 | 3/1999 |
| WO | 94/10675 | 5/1994 |
| WO | 95/25292 | 9/1995 |
| WO | WO 96/04582 | 2/1996 |
| WO | WO 99/60557 | 11/1999 |
| WO | WO 00/54096 | 9/2000 |
| WO | WO 00/76210 A1 | 12/2000 |
| WO | 01/41455 A1 | 6/2001 |
| WO | WO 01/69941 A2 | 9/2001 |
| WO | WO 02/03687 A2 | 1/2002 |
| WO | WO 02/03688 A2 | 1/2002 |
| WO | WO 02/19704 A2 | 3/2002 |
| WO | WO 03/050584 A1 | 6/2003 |

OTHER PUBLICATIONS

Patent Abstracts of Japan, vol. 013, No. 587(P-983) Dec. 25, 1989 & JP 01 251081 A (Toshiba Corp) Oct. 6, 1989.

Bleha, "Image Light Amplifier (ILA Technology for Large-Screen Projection," *SMPTE Journal*, 710-717 (Oct. 1997).

Chen, et al., 'Fundamentals of Sealable High Resolution Seamlessly Tiled Projection System,' *Proc. SPIE*, 4294:67-74 (2001).

Takahashi, et al., 'A Highly Realistic Video Display Based on the Interleave Projection Method,' *NTT Review*, 5(6):66-68 (Nov. 1993).

* cited by examiner

DIGITAL PROJECTION EQUIPMENT AND TECHNIQUES

REFERENCE TO PROVISIONAL APPLICATIONS

This application is based on and hereby refers to U.S. Provisional Patent Application Ser. No. 60/215,715, flied Jul. 3, 2000, having the same title as appears above, and U.K. Patent Application No. 0007891.5, filed Mar. 31, 2000, entitled Edge Masking.

FIELD OF THE INVENTION

This invention relates generally to projection of images and more specifically to techniques and equipment for enhancing characteristics (including but not limited to dynamic range) of images projected electronically through, typically, digital projectors.

BACKGROUND OF THE INVENTION

U.S. Pat. No. 5,386,253 to Fielding, incorporated herein in its entirety by this reference, discusses exemplary projection systems utilizing one or more spatial light modulators (SLMs). As noted in the Fielding patent:

Spatial light modulator devices include so-called "active matrix" devices, comprising an array of light modulating elements, or "light valves," each of which is controllable by a control signal (usually an electrical signal) to controllably reflect or transmit light in accordance with the control signal A liquid crystal array is one example of an active matrix device; another example is the deformable mirror device (DMD) developed by Texas Instruments . . .

See Fielding, col. 1, II. 13–21. Of course, yet other types of light "engines," or sources, exist, and various of them may be used in connection with the inventions described herein.

Regardless of the type of light sources and modulators used, audiences frequently desire to see images high in detail and richness and low in objectionable artifacts. High resolution and image quality in particular facilitates suspension of disbelief of an audience as to the reality of the projected images Such quality indeed often is an important factor in the overall success of the motion picture viewing experience among today's audiences.

Producing these high-resolution images is not without added cost, however. Imax Corporation, for example, the intended assignee of this application, utilizes not only specialized cameras and projectors, but also seventy millimeter, fifteen perforation film to increase the resolution and quality of projected images. Conventional electronic projectors (and especially these utilizing SLMs), by contrast generally cannot supply equivalent resolution in projected images. As well such electronic projectors frequently fail to furnish the dynamic range and overall brightness of images provided by large-format films. They nonetheless may desirably (or necessarily) be employed to display non-film-based images such as (but not limited to) computer-generated graphics or material captured with electronic cameras.

U.S. Pat. No. 5,490,009 to Venkateswar, et al., also incorporated herein in its entirety by this reference, details techniques purporting to enhance image resolution in systems employing multiple SLMs. According to the Venkateswar patent, sub-images generated by different SLMs are simultaneously displayed such that some sub-images are spatially offset horizontally or vertically from others. This results in partial superposition of the sub-images, with the offset supposedly allowing a two-SLM system (with each SLM having "x" pixels per row) to provide "a perceived quality approaching that of a system that generates a single image from an SLM having 2(x) pixels per row." See Venkateswar, col. 2. II. 41–43.

U.S. Pat. No. 5,612,753 to Poradish, et al., additionally incorporated herein in its entirety by this reference, discloses alternative techniques for, purportedly, increasing brightness of projected images or extending the projected number of gray levels. FIG. 1 of the Poradish patent illustrates a projection system in which light from two sources is reflected toward separate lens systems and then focused separately on distinct color wheels. Light from each color wheel thereafter is reflected to an SLM (preferably a DMD) via a total internal reflection (TIR) prism, with each SLM modulating the light and directing it back to the associated TIR prism. As directed, the light is then transmitted by the prisms to lenses for projection onto a screen. See Poradish, col 3, II. 6–39. In essence, therefore, the Poradish patent contemplates use of dual DMDs present in parallel paths existing from separate light sources to a screen.

While the techniques of the Venkateswar and Poradish patents arguably might enhance the resolution of an image produced by a digital projector, alone either is unlikely to provide resolution consistent with that of large-format film. Enhanced resolution of images produced by digital projection systems thus remains a significant issue for those engaged in development of commercial projection equipment. Absent further advancement in this area, viewing of electronically projected images remain less satisfying to public audiences.

SUMMARY OF THE INVENTION

The present invention seek to provide such advancements by addressing differences of, typically (but not necessarily exclusively electronic. SLM-employing projectors. It further does so in a more comprehensive manner than heretofore considered, attempting to create equipment and techniques capable of providing images of sufficient overall quality that they may be used in venues instead of, or in addition to, traditional large-format film projectors without disturbing audience perception that the viewed images are of high quality. As noted above, this perception is a significant aspect of modern-day viewing experiences, at times helping determine overall success among the public of particular motion pictures.

Embodiments of the present invention utilize not only superimposition, but also tiling to effect improvements to resolution of digitally projected images. "Tiling" describes the concept of joining two or more groups of images (or "sub-images") edge to edge, with each sub-image containing only a fraction of the total projected image. Because each sub-image conveys only a fraction of the overall image, its resolution will be greater than if the sub-image conveyed the total image itself.

Difficulties exist in, among other things, blending the images depicted at the edges of the tiled sub-images. Because abutting sub-images may result in the presence of seams visible to viewers, adjacent sub-images often are overlapped at their common edges to reduce the visibility of these seams. Mere overlapping of sub-images typically is insufficient, however, as the additive intensity of the images in the regions of overlap in some scenes likewise may be noticeable to audiences. General methods of reducing brightness in these regions typically include adjusting the images either electronically or optically; the latter method usually implemented using an opaque or reflective element placed in the beam of light.

Embodiments of the present invention employ instead a pyramid prism both to tile separate sub-images and to provide the requisite decrease in intensity of the sub-images in their regions of overlap. The sides of the pyramid prism constitute the reflective surfaces that combine separate sub-images together, while the apex of the prism acts as a complementary knife edge which optically provides the fall-off in intensity needed for enhanced blending of the sub-images in their overlapping regions An additional advantage of using the pyramid prism is that, by moving it forward and backward relative to the optical axis of the projector, fine-tuning of the size of the overlap regions can be achieved. Yet another advantage of the pyramid prism as beam combiner is that it admits use of a single projection lens, thus reducing cost and complexity of the overall system. Finally, to the extent seams exist in the overlap region, the techniques of the present invention tend to position such seams in the center of the projection lens where aberrations are lowest Tiling may be combined with superimposition at the light from complementary, offset SLMs is combined into a single image and directed to one side of the pyramid prism, while tie light from additional complementary, offset SLMs is combined into a single image and directed to the other side of the pyramid prism.

In a two SLM system, for example, such a combination may be accomplished by a series of polarizing beam splitters. One SLM is directed first to the transmissive face of a beam splitter, and then to the reflective face of a second beam splitter. The other SLM is first directed to the reflective face of a third beam splitter and then to the transmissive face of the second beam splitter where the images of the two SLMs are combined. This arrangement of polarizing beam splitters overcomes a well known defect of these devices which is that the polarizing action of either the reflection or transmission has a better extinction of the unwanted direction of polarization. By combining a reflection and a transmission for each of the SLMs the extinction that results is the same for each SLM while providing each SLM image with an orthogonal polarization with respect to the other.

If desired the resulting superimposed SLM images may be viewed with glasses with two polarizing lenses with orthogonal polarization. This causes the image of one SLM to be seen by one eye and the image of the other SLM to be seen by the other eye. In this case two images may be stereo image pairs, providing for stereoscopic, or "3D," projection, a result desirable or advantageous for some pictures. In this case the benefits of superimposition are lost, but the projector is now flexibly used for 2D projection with enhanced resolution from superimposition, or used for 3D projection with lower resolution but without additional equipment except for the polarizing glasses worn by the viewer.

The combination of superimposition and tiling of sub-images provides high spatial resolution without significantly increasing system size, cost, or complexity. A system using four SLMs, each of 1280×1024 pixels, for example, arranges as two tiles, each composed of two superimposed SLMs. This arrangement results in a final screen resolution equivalent to approximately 1800 (vertical) and 2750 (horizontal) pixels through one projection lens, alone presenting a substantial increase in resolution.

The present invention nevertheless contemplates further enhancement of the quality of projected images. Selected embodiments of the invention may use additional SLMs as pre-modulators to improve the contrast, or dynamic range, of the system. Ideally, two or more SLMs would be arranged so that there exists precise one-to-one correspondence of their pixels. Each SLM could be driven independently but in concert so that their dynamic range capabilities would combine to extend the resulting dynamic range. Alternatively a coarser (i.e. with less resolution) SLM may be used as the pre-modulator to enhance the dynamic range of a group of pixels of the associated downstream SLM.

Some preferred embodiments of the invention employ a single-pixel pre-modulator (typically an SLM) adapted to improve the dynamic range of the entire downstream SLM. In operation, the pre-modulator would function to block light from the downstream SLM to darken its entire image and enhance the black levels of selected scenes The downstream SLM would retain its full dynamic range capability, but would have as its input new illumination levels when appropriate or desired For scenes that are bright, the pre-modulator need not be activated; in which event normal brightness levels would be maintained. The pre-modulator thus may be used to adapt the projector to scene brightnesses, matching generally how the human visual system functions Yet additional features of the present invention include luminance compensation for selectively increasing the illumination levels provided by the downstream SLMs when, for example, further overall scene contrast is desired. Compensation algorithms may particularly be useful when single-pixel pre-modulators are used, as the global pre-modulation they provide may occasionally diminish too much the input to the downstream SLMs. Finally, improved scene contrast additionally may occur through use of one or more masks for the superimposed, tiled images. These masks may be used effectively to block unwanted glare produced around the edges of the SLMs. In particular, when tiling of multiple SLMs is to occur, a secondary "shading" mask may be employed in a plane axially defocussed from a relayed image for improved results.

It thus is an object of the present invention to provide methods and equipment for enhancing characteristics (including but not limited to resolution, contrast, and dynamic range) of projected images.

It is another object of the present invention to provide methods and equipment for performing such enhancement more comprehensively than heretofore considered, employing techniques including (but again not limited to) either or both of superimposing and tiling sub-images.

It is a further object of the present invention to provide methods and equipment for reducing visible seaming of tiled images some methods beneficially utilizing both the reflective surfaces and the apex of a pyramid prism.

It also is an object of the present invention to provide methods and equipment for polarizing light from offset light sources and combining the polarized images, which may then be used (if desired), for stereoscopic protection.

It is an additional object of the present invention to provide techniques and equipment for projection in which one or more pre-modulators are employed to improve contrast, or dynamic range, of projected images.

It is yet another object of the present invention to provide techniques and equipment in which one-pixel pre-modulators are utilized, with such equipment optionally including compensation algorithms for correctional purposes.

It is, moreover, an object of the present invention to provide one or more optical masks to reduce glare around edges of and otherwise improve contrast of projected images.

Other objects, features, and advantages of the present invention will be apparent to those skilled in the relevant art with reference to the remainder of the text and drawings of this application

DETAILED DESCRIPTION OF THE DRAWINGS

Figure 2:
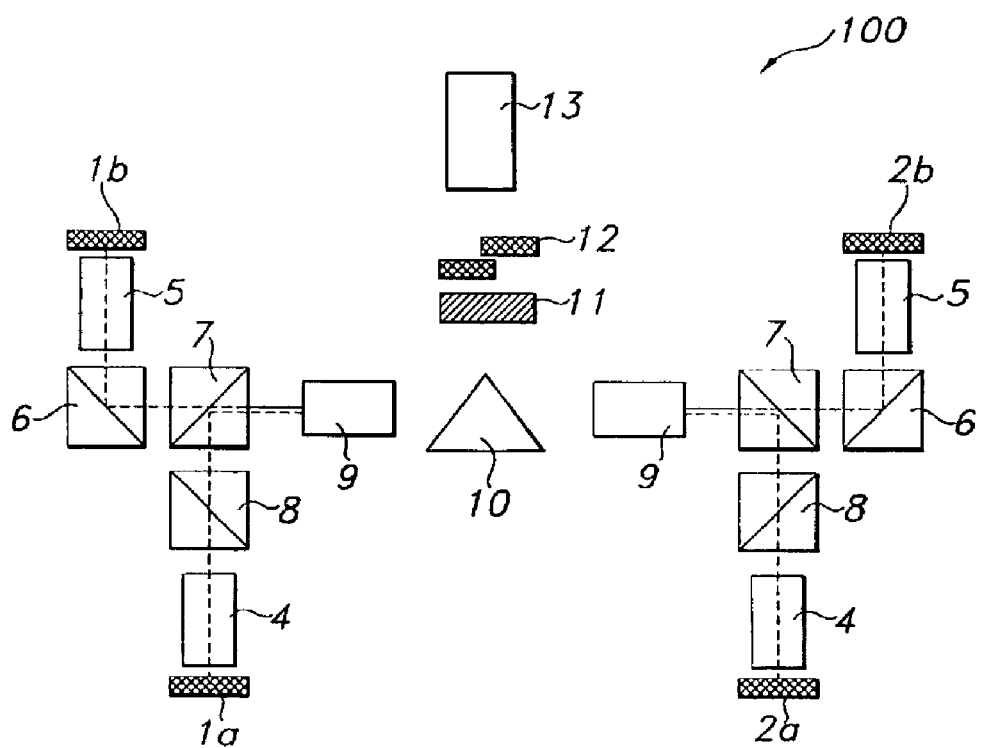
FIG. 2 is a schematicized diagram of components of an exemplary system of the present invention, which may be used to produce the image of FIG. 1D

FIG. 2 illustrates components that may be utilized as part of or in connection with an exemplary projector 100 of the present invention. As shown in FIG. 2, projector 100 may include first and second SLM sets 1 (comprising 1a and 1b) and 2 (comprising 2a and 2b), respectively, each of which may (but need not) comprise one or more DMDs. Likewise, although four SLMs are depicted (as elements 1a, 1b, 2a, and 2b) in FIG. 2, fewer or greater numbers may be employed yet remain consistent with various of the techniques of the present invention.

Also depicted in FIG. 2 are three polarizing beam splitters 6, 7 and 8. The image of SLM 1a via relay lens 4 is transmitted through polarizing beam splitter 8 and reflected by beam splitter 7 through second relay lens 9 to mirrored pyramid prism 10. At the same time the image of SLM 1b via relay lens 5 is reflected by polarizing beam splitter 6 and transmitted through polarizing beam splitter 7 through second relay lens 9 to mirrored pyramid prism 10. The two SLM images are combined in polarizing beam splitter 7, with the one having an orthogonal polarization with respect to the other In each case polarizing beam splitters 6 and 8 provide a "clean up" function to ensure that extinction of the unwanted polarizing component is achieved for both SLM images which is a requirement when the system is used for 3D stereoscopic image projection.

Figure 1A:
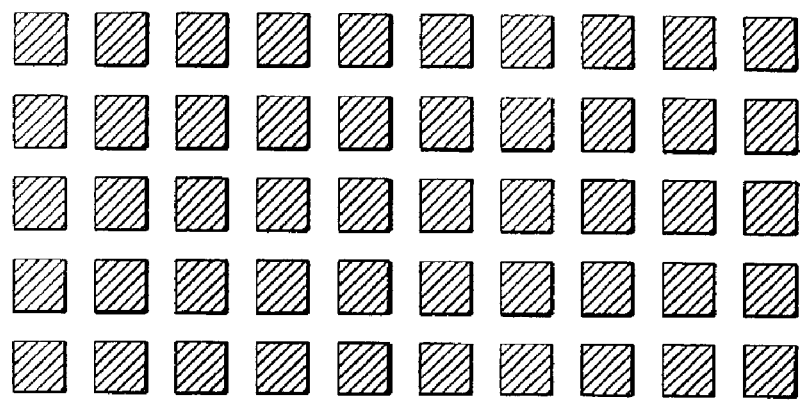
FIG. 1A is a schematicized depiction of a first sub-image output from a first SLM.
Figure 1B:
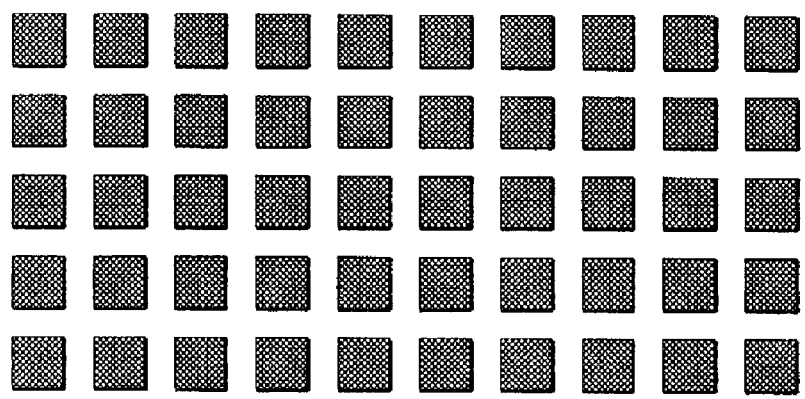
FIG. 1B is a schematicized depiction of a second sub-image output from a second SLM.
Figure 1C:
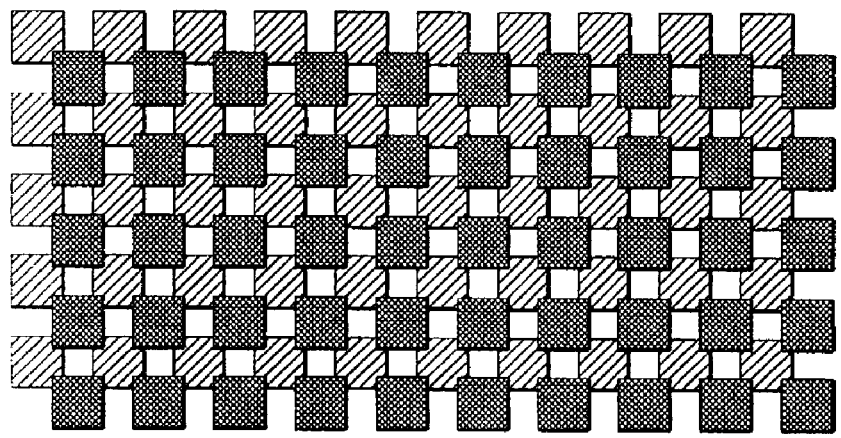
FIG. 1C is a schematicized depiction of the second sub-image superimposed on the first sub-image to form a first composite image.
Figure 1D:
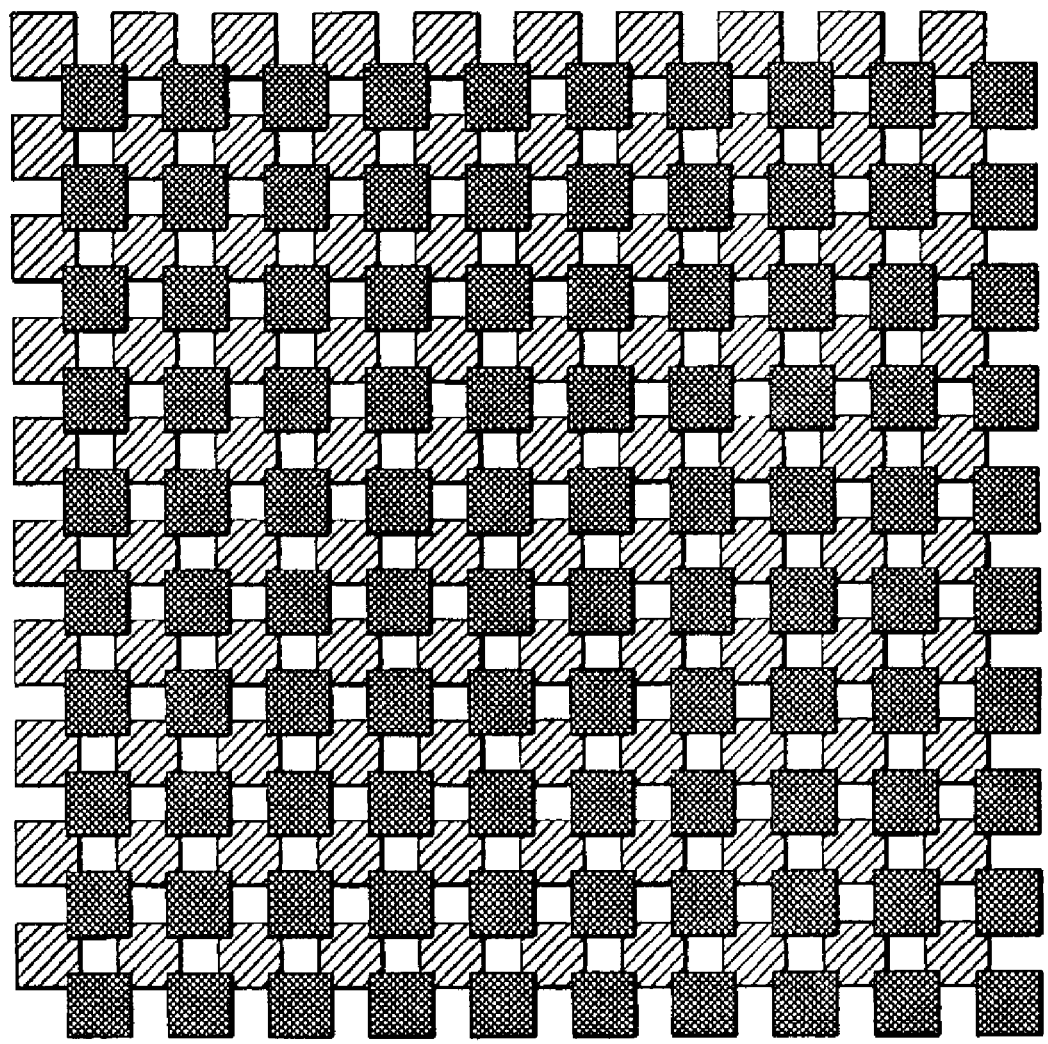
FIG. 1D is a schematicized depiction of the first composite image tiled with a second, similarly created composite image to produce an overall projected image using techniques of the present invention.

The SLMs of each of sets 1 and 2 typically are complementary, with the optical output of one spatially offset (preferably) one-half pixel both horizontally and vertically with respect to the other. Thus, as each splitter 7 combines the beams of the SLMs of its associated set 1 or 2, the sub-image of SLM 1a effectively is superimposed on that provided by SLM 1b (or vice-versa), and the sub-image of SLM 2a is superimposed on the sub-image produced by SLM 2b (or vice-versa). This relationship for a set 1 or 2 is depicted generally in FIG. 1C, which illustrates the optical output of, for example, SLM 1a (see FIG. 1B) superimposed on that (see FIG. 1A) of SLM 1b. As clearly discernable from FIG. 1C, such superimposition indeed may enhance the resolution of (or brighten or increase dynamic range of) the composite image by providing additional image information in the pixel interstices of the images produced by either SLM of set 1 or 2

Once again, conventional relay optics 9 may be used to convey the combined (superimposed) beams targeting mechanism, shown in FIG. 2 as pyramid prism 10. Each combined beam impinges on a reflective side of prism 10 in a manner permitting the apex of prism 10 to dampen the intensity of the illumination of the region of their intended overlap This permits prism 10 to combine the composite beams to produce a tiled image 12 having well-blended density in the region of then overlap. Such image 12 may then be passed to projection lens 13 for projection onto a screen or other suitable surface or object. If desired, an edge mask 11 may be interposed between prism 10 and lens 13 to reduce edge glare or other undesirable characteristics of tiled image 12 before it is projected. Although those skilled in the art undoubtedly appreciate advantages available through use of the surfaces and apexes of pyramid prism 10, different tiling mechanisms may be used instead without undermining other novel aspects of the present invention.

Relay optics 9 may also function to equalize magnification of the optical signals of the two channels (one emanating from SLM set 1 and the other from SLM set 2) of projector 100 before the signals are projected through lens 13. Such function is especially important in certain embodiments of projector 100, which may omit pyramid prism 10 in favor of other edge-blending mechanisms (placed either before or after lens 13 in the optical path). One alternative to prism 10 is a pair of mirrors, one for each optical channel of the projector 100. In effect, the two optical paths are directed to separate mirrors (rather than prism 11) and thence through separate lenses (instead of the single lens 13 shown in FIG. 2) for projection onto a screen. In these embodiments, the tiled image is formed at the screen rather than within projector 100.

Figure 3:
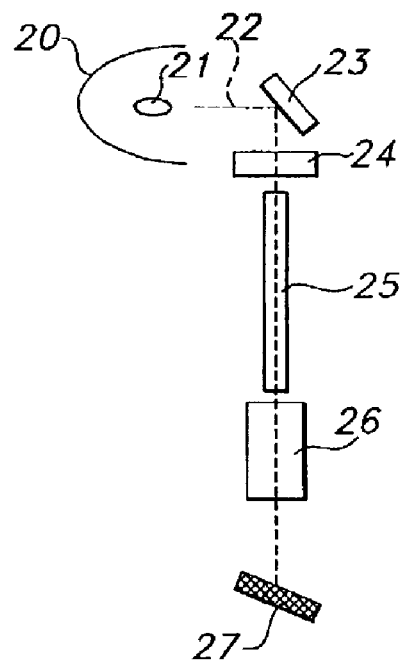
FIG. 3 is a schematicized diagram showing a pre-modulator, which may be employed as part of the present invention.

FIG. 3 illustrates pre-modulator 24 that may be used as part of the present invention. Light 22 from lamp 21 and reflector 20 is directed by cold mirror 23 to pre-modulator 24. Noted earlier is that pre-modulator 24 can be an SLM, preferably (although not necessarily) a single-pixel device in some embodiments, utilized to improve the dynamic range of downstream SLMs. Light modulated by pre-modulator 24 may than travel through integrating bar 25 and through illumination relay 26 to SLM 27. Such SLM 27 corresponds to either SLMs 1a and 1b or SLMs 2a and 2b of FIG. 2.

Figure 4:
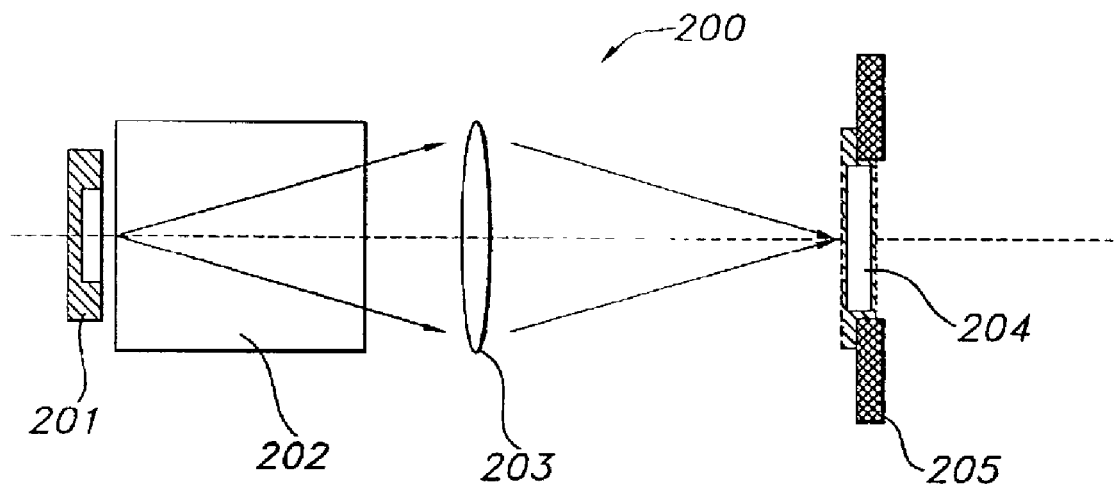
FIG. 4 is a schematicized diagram of a simplified optical relay system showing exemplary placement of an edge mask.

FIG. 4 details exemplary placement of an edge mask, denominated 205, in a simplified illustration of an optical relax, system 200. Conceptually, system 200 may be used to create an intermediate image of an SLM (or other light source) in space beyond a prism 202. Creating the image in this location would allow the use of a rectangular mask (as mask 205) to select only the rectangular active area of the SLM to pass to subsequent optical systems. This would effectively eliminate the areas of the SLM illustrated by scatter and beam overfill. The overall effect would be to enhance system contrast and control the edge illumination enabling successful tiling of separate SLM images As shown in FIG. 4 SLM assembly 201 is attached to prism 202 through which light is directed toward relay lens 203 An image of the SLM assembly is located at numeral 204. Edge mask 205 is located at the place of image 204 and functions to eliminate edge glare around the whole of the SLM Additional masks 205 typically cannot be introduced in the image plane, as they may clip the SLM image and reduce the resulting picture size. However, in parallel planes displaced from the image plane, it is possible to introduce a mask to affect only the illumination cones rather than the image size. Doing so permits modification of the image illumination along the "overlap" side so as to reduce the overlap intensity.

Figure 5:
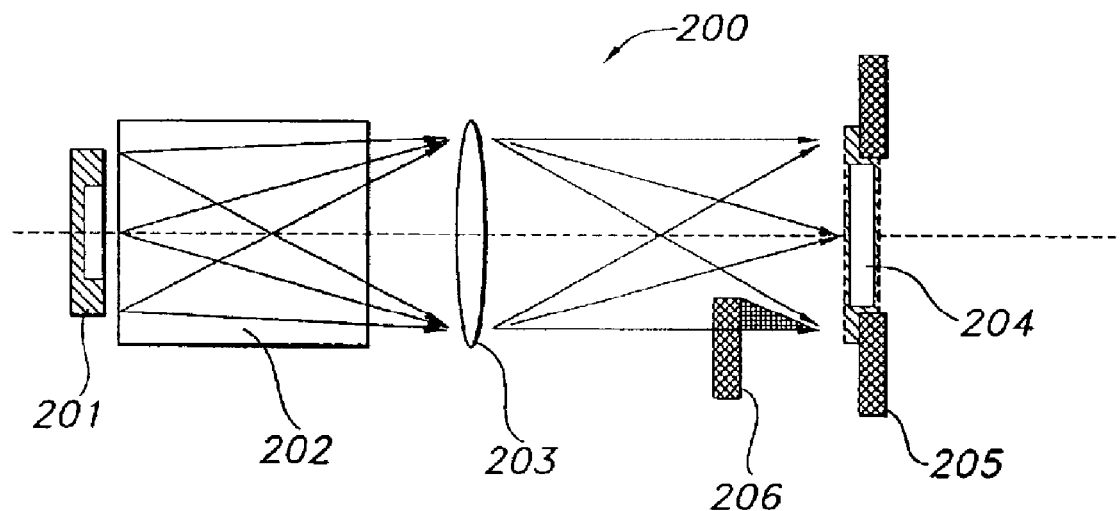
FIG. 5 is a schematicized diagram of the system of FIG. 4 showing, as well, exemplary placement of a secondary shading mask.

In FIG. 5, a shading mask 206 has been introduced between relay lens 203 and SLM image 204. Shading mask 206 will clip the illumination cone but should not affect image size. Rather, it will affect the illumination distribution at the end of the image without affecting the distribution in other parts of the image. By positioning shading mask 206 at a particular perpendicular distance from the SLM image plane and optical axis, it is possible to create a defined decrease in intensity at the end of the SLM image.

The intensity variation can also be matched spatially with the intended overlap dimension of two adjacent images. A second adjacent image with an identical intensity fall off over the opposite overlap dimension can also be creased. If the two images are then overlapped by the defined overlap dimension, the intensity should remain constant over the overlap region.

Because the foregoing is provided for purposes of illustrating, explaining, and describing embodiments of the present invention, further modifications and adaptations to these embodiments will be apparent to those skilled in the art and may be made without departing from the scope or spirit of the invention. For example, as noted above, the position of prism 10 relative to lens 13 may be mobile, thereby permitting further refinement of the size of the region of overlap of the beams forming tiled image 12. Pre-modulation, compensation algorithms, and image coding additionally may occur consistent with the invention, and the systems and numbers of components described herein may be scaled as appropriate to effect desired results Yet additionally, ferroelectric devices, liquid-crystal displays (LCD), or other light sources or valves may be employed as necessary or desired Finally in some cases, only green or luminance information might be superimposed.

What is claimed is:

1. An optical projection system comprising:
   at least one light source;
   at least a first spatial tight modulator producing at least a first image;
   a first polarizing beam splitter between the at least one light source and the at least one first spatial light modulator;
   at least a second spatial light modulator producing at least a second image;
   a second polarizing beam splitter between the at least one light source and the at least one second spatial light modulator;
   a combining polarizing beam splitter for combining the first image and the second image by superimposition to create a composite first image, wherein the first image is transmitted by the first polarizing beam splitter and reflected by the combining polarizing beam splitter and the second image is reflected by the second polarizing beam splitter and transmitted by the combining polarizing beam splitter.

2. The optical projection system of claim 1, wherein a second composite image is produced by superimposition and the projection system further comprises a first reflective surface and a second reflective surface for combining the first composite image and the second composite image into a composite tiled image by partially overlapping the first composite image and the second composite image.

3. The optical projection system according to claim 2, wherein the first reflective surface and the second reflective surface are disposed so that the first reflective surface and the second reflective surface meet at an apex.

4. The optical projection system according to claim 3 wherein the first reflective surface and the second reflective surface are formed by a prism.

5. The optical projection system according to claim 1 further comprising at least one pre-modulator.

* * * * *